United States Patent
Nagashima et al.

(10) Patent No.: US 11,820,695 B2
(45) Date of Patent: Nov. 21, 2023

(54) MANUFACTURING METHOD FOR PREFORM OF MULTI-CORE FIBER AND MANUFACTURING METHOD FOR MULTI-CORE FIBER

(71) Applicant: SUMITOMO ELECTRIC INDUSTRIES, LTD., Osaka (JP)

(72) Inventors: Takuji Nagashima, Osaka (JP); Kimiaki Sato, Osaka (JP); Kazuo Kaneko, Osaka (JP); Akira Kawai, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 295 days.

(21) Appl. No.: 17/202,589

(22) Filed: Mar. 16, 2021

(65) Prior Publication Data

US 2021/0300812 A1    Sep. 30, 2021

(30) Foreign Application Priority Data

Mar. 30, 2020   (JP) .................................. 2020-060287

(51) Int. Cl.
   *C03B 37/027*   (2006.01)
   *C03B 37/012*   (2006.01)
   *G02B 6/02*     (2006.01)

(52) U.S. Cl.
   CPC ...... *C03B 37/027* (2013.01); *C03B 37/01222* (2013.01); *G02B 6/02042* (2013.01)

(58) Field of Classification Search
   None
   See application file for complete search history.

(56) References Cited

U.S. PATENT DOCUMENTS

2018/0244556 A1    8/2018   Nagashima et al.

FOREIGN PATENT DOCUMENTS

| EP | 637762 A1 * | 2/1995 | ....... C03B 37/01217 |
| JP | 2011-168464 A | 9/2011 | |
| JP | 2018-140911 A | 9/2018 | |

OTHER PUBLICATIONS

JP 2014-47116 machine translation, Ishida et al., Optical Fiber and Method for Manufacturing the same. Mar. 2014 (Year: 2014).*

* cited by examiner

*Primary Examiner* — Queenie S Dehghan
(74) *Attorney, Agent, or Firm* — Faegre Drinker Biddle & Reath LLP

(57) ABSTRACT

A manufacturing method includes forming one or more first holes in a cladding rod, inserting a first glass rod into each of the one or more first holes, heating the cladding rod together with the inserted first glass rod to integrate the first glass rod and the cladding rod and to form an intermediate preform, forming one or more second holes in the intermediate preform, inserting a second glass rod into each of the one or more second holes, and heating the intermediate preform together with the inserted second glass rod to integrate the second glass rod and the intermediate preform.

12 Claims, 9 Drawing Sheets

MANUFACTURING METHOD FOR PREFORM OF MULTI-CORE FIBER AND MANUFACTURING METHOD FOR MULTI-CORE FIBER

CROSS REFERENCE TO RELATED APPLICATIONS

This application is based on Japanese Patent Applications No. 2020-060287 filed on Mar. 30, 2020, the entire contents of which are incorporated herein by reference.

TECHNICAL FIELD

The present disclosure relates to a manufacturing method for a preform of a multi-core fiber and a manufacturing method for a multi-core fiber.

BACKGROUND ART

There has been known a multi-core fiber in which a plurality of cores each made of silica glass and having a refractive index larger than a refractive index of a common cladding are arranged in the common cladding made of silica glass (see, for example, JP-A-2011-168464 and JP-A-2018-140911).

As a general method for manufacturing a preform of a multi-core fiber, there is a method in which a plurality of holes are formed in a cladding rod serving as a preform, a glass rod is inserted into each of the holes, and the inserted glass rod and the cladding rod are heated and integrated. By arranging the plurality of glass rods at a high density on one preform, a multi-core fiber having a high core density can be obtained. However, in this method, since a thickness of the cladding rod between adjacent holes may be reduced, there is a matter that a thin portion of the cladding rod is likely to be broken during manufacture of the preform.

In view of the above, the present disclosure provides a manufacturing method for a preform of a multi-core fiber and a manufacturing method for a multi-core fiber capable of reducing breakage of a cladding rod.

SUMMARY OF INVENTION

According to an aspect of the invention, a manufacturing method for a preform of a multi-core fiber including a plurality of cores and a cladding that surrounds the plurality of cores in a state where the cores are separated from each other and has a refractive index smaller than a refractive index of each core, includes a first step of forming one or more first holes in a cladding rod, inserting a first glass rod into each of the one or more first holes, and heating the cladding rod together with the first glass rod to integrate the first glass rod and the cladding rod and to form an intermediate preform, and a second step of forming one or more second holes in the intermediate preform, inserting a second glass rod into each of the one or more second holes, and heating the intermediate preform together with the inserted second glass rod to integrate the second glass rod and the intermediate preform.

According to another aspect of the invention, a manufacturing method for a multi-core fiber including a plurality of cores and a cladding that surrounds each of the plurality of cores in a state where the cores are separated from each other and has a refractive index smaller than a refractive index of each core, includes a first step of forming one or more first holes in a cladding rod, inserting a first glass rod into each of the one or more first holes, and heating the cladding rod together with the inserted first glass rod to integrate the first glass rod and the cladding rod and to form an intermediate preform, a second step of forming one or more second holes in the intermediate preform, and inserting a second glass rod into each of the one or more second holes, and a step of drawing the intermediate preform together with the inserted second glass rod. In the method, a position of each of the one or more second holes is closer to a center axis of the cladding rod than a position of each of the one or more first holes.

According to the present disclosure, it is possible to provide the manufacturing method for a preform of a multi-core fiber and the manufacturing method for a multi-core fiber capable of reducing the breakage of the cladding rod.

DESCRIPTION OF EMBODIMENTS

Figure 1:
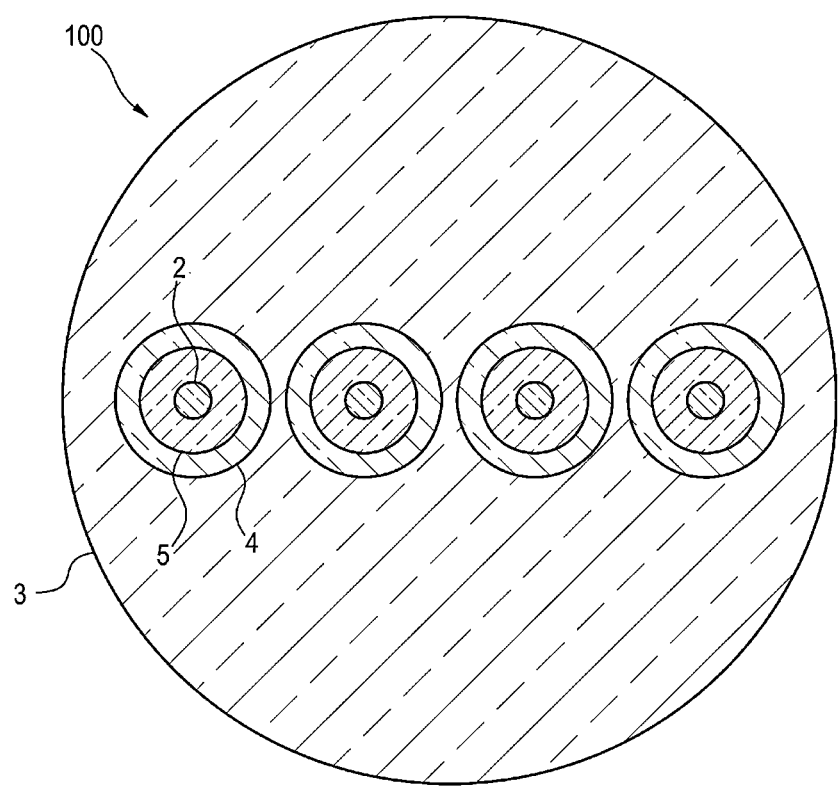
FIG. 1 is a sectional view of a multi-core fiber according to a first embodiment of the present disclosure.

Description of Aspect of the Present Disclosure

First, aspects of the present disclosure will be listed and described.

(1) A manufacturing method for a preform of a multi-core fiber according to an aspect of the present disclosure is a manufacturing method for a preform of a multi-core fiber including a plurality of cores and a cladding that collectively surrounds each of the plurality of cores and has a refractive index smaller than a refractive index of each core, includes a first step of forming one or more first holes in a cladding rod, inserting a first glass rod into each of the one or more of first holes, and heating the cladding rod together with the inserted first glass rod to integrate the first glass rod and the cladding rod and to form an intermediate preform, and a second step of forming one or more second holes in the intermediate preform, inserting a second glass rod into each of the one or more of second holes, and heating the intermediate preform together with the inserted second glass rod to integrate the second glass rod and the intermediate preform.

According to the present aspect, since the second glass rod and the intermediate preform are integrated in the second step after the first glass rod and the cladding rod are integrated in the first step, even when a distance between the first hole and the second hole is narrow, it is possible to reduce a possibility that the cladding rod between the first hole and the second hole is broken.

(2) The one or more first holes include a plurality of first holes, and a closest distance between two holes adjacent to each other among the plurality of first holes is 2 mm or more. In this case, the "closest distance between two holes adjacent to each other" means "a thickness of the cladding rod between two holes adjacent to each other". According to the present aspect, breakage of the cladding rod may be further avoided.

(3) The one or more second holes include a plurality of second holes, and a closest distance between two holes adjacent to each other among the plurality of second holes is 2 mm or more. According to the present aspect, the breakage of the cladding rod may be further avoided.

(4) A position of each of the one or more of second holes is closer to an outer periphery of the cladding rod than a position of each of the one or more of first holes.

As a general manufacturing method for a multi-core fiber including a central core provided at a central portion of a fiber and a peripheral core provided on an outer peripheral portion of the fiber, a method of integrating the central core and the peripheral core at the same time is known. During heating, the cladding rod around a center glass rod contracts to integrate with the center glass rod, and the cladding rod around a peripheral glass rod also contracts to integrate with the peripheral glass rod. In this case, since the cladding rod contracts at the same time around the center glass rod and around the peripheral glass rod, there is a matter that a position of the peripheral core tends to shift. In addition, when the cladding rod is thick, heat hardly reaches the center glass rod during the heating, and the integration between the center glass rod and the cladding rod may be incomplete.

According to the present aspect, the first glass rod is integrated with the cladding rod at a position close to the center axis of the cladding rod to form an intermediate preform in the first step, and thereafter, the second glass rod is integrated with the intermediate preform at a position close to the outer periphery of the cladding rod in the second step. That is, when the second glass rod is integrated, the second glass rod is positioned with higher accurately without being affected by contraction of the cladding rod around the first glass rod.

(5) A position of each of the one or more of second holes is closer to a center axis of the cladding rod than a position of each of the one or more of first holes.

According to the present aspect, the first glass rod is integrated with the cladding rod at a position close to the outer periphery of the cladding rod to form an intermediate preform in the first step, and thereafter, the second glass rod is integrated with the intermediate preform at a position close to the center of the cladding rod in the second step. That is, when the second glass rod is integrated, the first glass rod is already integrated, so that the second glass rod is positioned with higher accuracy without being affected.

(6) The second hole is formed by removing at least a part of the first glass rod integrated in the first step. According to the present aspect, the cladding rod allows the glass rod to be arranged at a high density.

(7) A manufacturing method for a multi-core fiber according to an aspect of the present disclosure is a manufacturing method for a multi-core fiber including a plurality of cores and a cladding that collectively surrounds each of the plurality of cores and has a refractive index smaller than a refractive index of each core, includes a first step of forming one or more first holes in a cladding rod, inserting a first glass rod into each of the one or more of first holes, and heating the cladding rod together with the inserted first glass rod to integrate the first glass rod and the cladding rod and to form an intermediate preform, a second step of forming one or more second holes in the intermediate preform and inserting a second glass rod into each of the one or more of second holes, and a step of drawing the intermediate preform together with the inserted second glass rod. A position of each of the one or more of second holes is closer to a center axis of the cladding rod than a position of each of the one or more of first holes. According to the present aspect, the "heating and integrating" step in the second step of (1) may be omitted, and the multi-core fiber is manufactured.

(8) The one or more first holes include a plurality of first holes, and a closest distance between two holes adjacent to each other among the plurality of first holes is 2 mm or more. According to the present aspect, the breakage of the cladding rod may be further avoided.

(9) The one or more second holes include a plurality of second holes, and a closest distance between two holes adjacent to each other among the plurality of second holes is 2 mm or more. According to the present aspect, the breakage of the cladding rod may be further avoided.

(10) The second hole is formed by removing at least a part of the first glass rod integrated in the first step. According to the present aspect, the cladding rod allows the glass rod to be arranged at the high density.

First Embodiment of the Present Disclosure

Specific examples of an optical fiber unit and an optical fiber cable according to an embodiment of the present disclosure will be described with reference to the drawings. The present disclosure is not limited to these examples but indicated by the scope of claims, and is intended to include meanings equivalent to the scope of claims and all modifications within the scope.

FIG. 1 is a sectional view of a multi-core fiber 100 according to a first embodiment of the present disclosure. As shown in FIG. 1, the multi-core fiber 100 includes a plurality of cores 2, and a cladding 3 surrounding each of the plurality of cores 2 and having a refractive index lower than that of each of the cores 2. The multi-core fiber 100 includes, in addition to the cores 2 and the cladding 3, trenches 4 each having a refractive index lower than that of the cladding 3 between the corresponding core 2 and the cladding 3, and core peripheral portions 5 each having a refractive index lower than that of the core 2 and higher than that of the trench 4 between the core 2 and the trench 4. Although the multi-core fiber 100 includes four cores 2 in FIG. 1, the multi-core fiber 100 may include at least two cores.

A main component of the multi-core fiber 100 is quartz glass. To adjust the refractive index, a substance for adjusting the refractive index is added to the quartz glass. For example, germanium is added to the core 2, and fluorine is added to the trench 4. An outer diameter of the multi-core fiber 100 is, for example, 125 µm, and a diameter of the core 2 is, for example, 10 µm.

Figure 2:
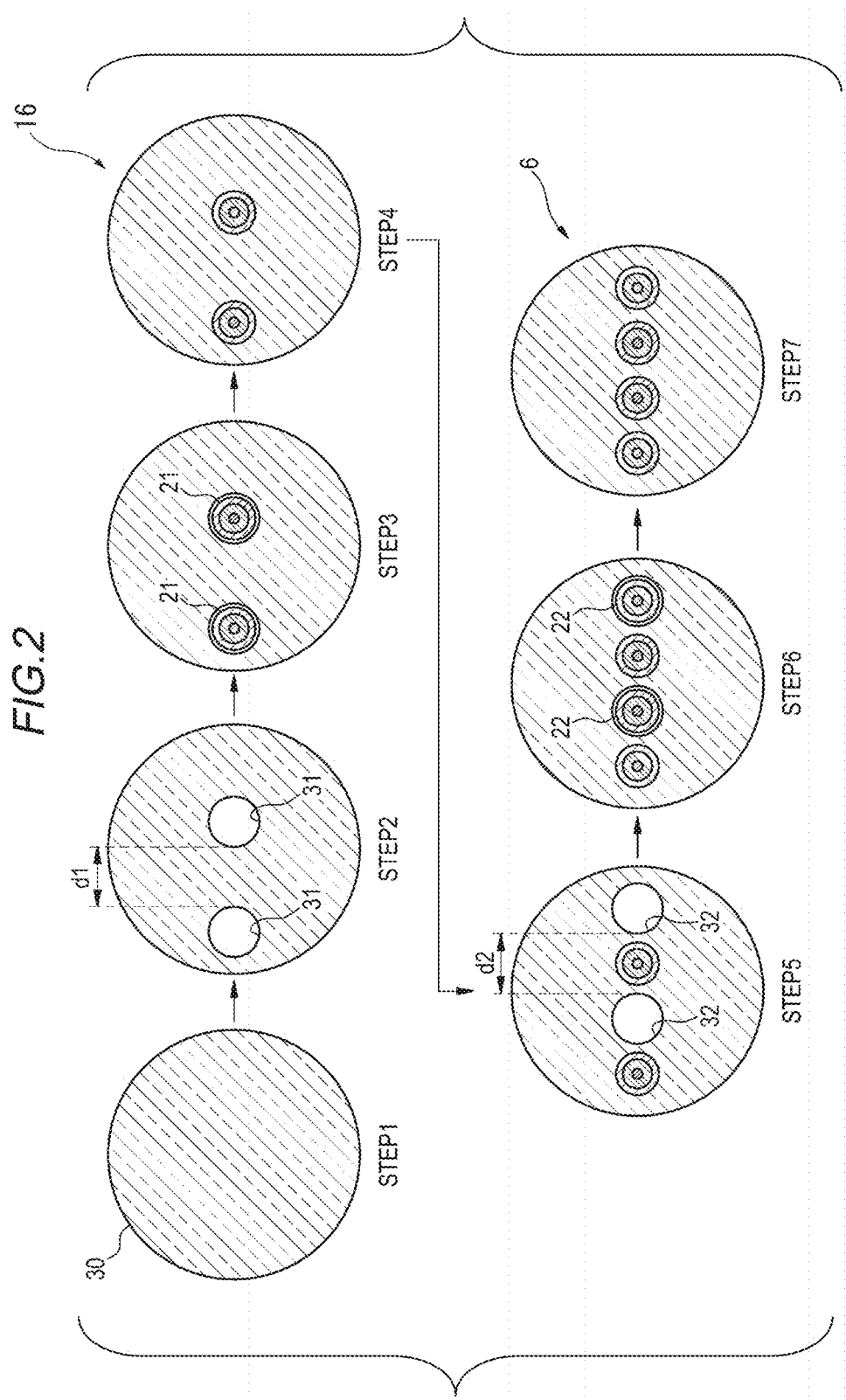
FIG. 2 is a process chart of a manufacturing method for a preform of a multi-core fiber.

Next, a manufacturing method for a preform 6 of the multi-core fiber 100 according to the present embodiment will be described. FIG. 2 is a process chart of a manufacturing method for the preform 6 of the multi-core fiber 100. As shown in FIG. 2, first, a cladding rod 30 that can be the cladding 3 of the multi-core fiber 100 is prepared (STEP 1 in FIG. 2). A main component of the cladding rod 30 is quartz glass and has a columnar shape. Two first holes 31 are formed in the cladding rod 30 by, for example, drilling with a drill or laser processing (STEP 2 in FIG. 2). In the two first holes 31, a closest distance d1 between the two first holes 31 adjacent to each other is 2 mm or more. A first glass rod 21, which can be the core 2, the trench 4, and the core peripheral portion 5 of the multi-core fiber 100, is inserted into each of the two formed first holes 31 (STEP 3 in FIG. 2). A main component of the first glass rod 21 is quartz glass and has a columnar shape. A portion of the first glass rod 21 that can be the core 2 has the highest refractive index. For example, fluorine is added to the quartz glass as a main component so that a portion of the first glass rod 21 that can be the trench 4 has a refractive index lower than the refractive index of the cladding rod 30. For example, fluorine may be added to the quartz glass as a main component so that a portion of the first glass rod 21 that can be the core peripheral portion 5 has a refractive index equal to or higher than the refractive index of the trench 4 and lower than the refractive index of the core 2. The cladding rod 30 is heated together with the inserted first glass rod 21 by, for example, a cylindrical core tube or burner in a heating furnace, and the first glass rod 21 and the cladding rod 30 are integrated to form an intermediate preform 16 (STEP 4 in FIG. 2). In the present disclosure, a step of forming the first hole 31, inserting the first glass rod 21, and heating and integrating the first glass rod 21 and the cladding rod 30 (STEPs 2 to 4 in FIG. 2) is included in a first step.

After the first step, two second holes 32 are formed in the intermediate preform 16 by, for example, drilling with a drill or laser processing (STEP 5 in FIG. 2). A diameter of the second hole 32 is the same as the diameter of the first hole 31. In the two second holes 32, a closest distance d2 between the two second holes 32 adjacent to each other is 2 mm or more. A second glass rod 22, which can be the core 2 of the multi-core fiber 100, is inserted into each of the two formed second holes 32 (STEP 6 in FIG. 2). A main component of the second glass rod 22 is quartz glass and has a columnar shape. A configuration, shape, and size of the second glass rod 22 may be the same as those of the first glass rod 21. The intermediate preform 16 is heated together with the inserted second glass rod 22, and the second glass rod 22 and the intermediate preform 16 are integrated (STEP 7 in FIG. 2). In the present disclosure, a step of forming the second hole 32, inserting the second glass rod 22, and heating and integrating the second glass rod 22 and the intermediate preform 16 (STEPs 5 to 7 in FIG. 2) is included in a second step. Therefore, in the manufacturing method according to the present embodiment, the preform 6 of the multi-core fiber 100 is manufactured through the first step and the second step.

In a general manufacturing method for a preform of a multi-core fiber, a plurality of holes are formed at a time in a cladding rod. At this time, when a distance between two holes adjacent to each other is narrow, a thickness of the cladding rod between the two adjacent holes may be reduced. Therefore, there may be a matter that a thin portion of the cladding rod is likely to be broken during manufacture of the preform.

However, the manufacturing method according to the present embodiment includes the first step and the second step. When the second hole 32 is formed, the first glass rod 21 inserted into the first hole 31 is already integrated with the cladding rod 30. Therefore, even when a distance between the first hole 31 and the second hole 32 is narrow, it is possible to reduce a possibility that the cladding rod 30 between the first hole 31 and the second hole 32 is broken.

The inventors evaluated the closest distance between the two holes adjacent to each other and the existence or non-existence of breakage of the cladding 3. Table 1 shows evaluation results. As shown in Table 1, in Sample 1 and Sample 2, breakage exists in the cladding 3. However, in Samples 3 to 5, no breakage exist in the cladding 3. Therefore, in each of the first and second steps according to the present embodiment, since the closest distance between the two holes adjacent to each other is 2 mm or more, breakage of the cladding rod may be further avoided.

TABLE 1

| Sample number | Closest distance between two holes (mm) | Existence or non-existence of breakage of cladding |
|---|---|---|
| 1 | 0.99 | Existing |
| 2 | 1.14 | Existing |
| 3 | 2.10 | No-Breakage |
| 4 | 2.39 | No-Breakage |
| 5 | 2.57 | No-Breakage |

First Modification of First Embodiment of the Present Disclosure

Figure 3:
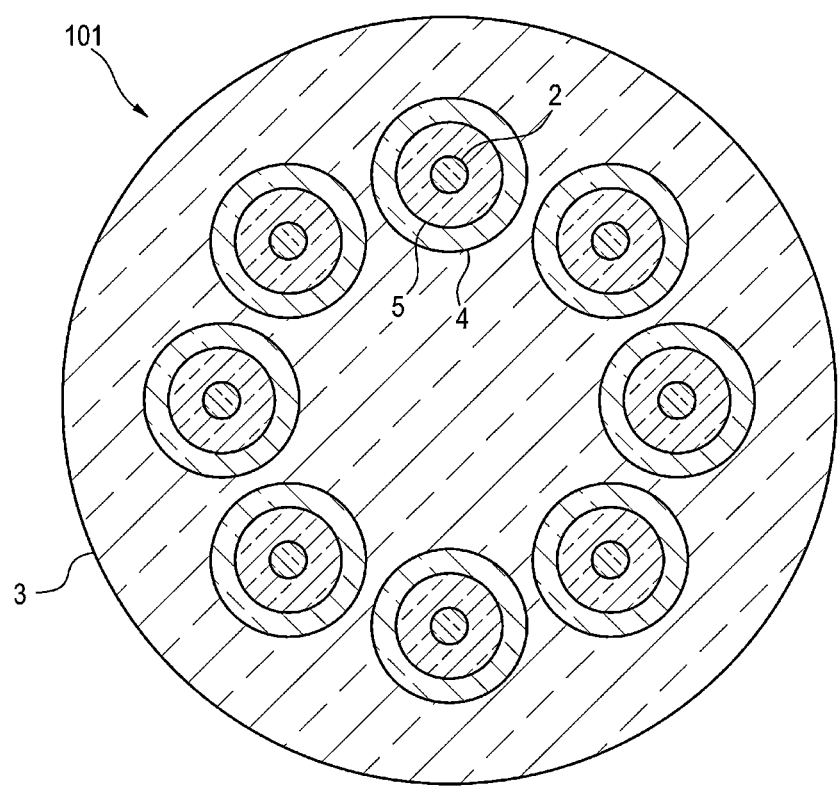
FIG. 3 is a sectional view of a multi-core fiber according to a first modification of the first embodiment.

FIG. 3 is a sectional view of a multi-core fiber 101 according to a first modification of the first embodiment of the present disclosure. As shown in FIG. 3, the multi-core fiber 101 includes eight cores 2. Elements substantially the same as or corresponding to those illustrated in FIG. 1 are denoted by the same reference numerals, and a repetitive description thereof will be omitted.

Next, a manufacturing method for a preform of the multi-core fiber 101 according to the present modification will be described. The manufacturing method according to the present modification also includes the first step and the second step. First, four first holes are formed in the cladding rod. The four first holes are formed at positions of 0 degrees, 90 degrees, 180 degrees, and 270 degrees with respect to a center axis of the cladding rod. In the four first holes, the closest distance between the two first holes adjacent to each other is 2 mm or more. A first glass rod is inserted into each of the four formed first holes. The cladding rod is heated together with the inserted first glass rod, and the first glass rod and the cladding rod are integrated to form an intermediate preform (first step).

After the first step, four second holes are formed in the intermediate preform. The four second holes are formed at positions of 45 degrees, 135 degrees, 225 degrees, and 315 degrees with respect to the center axis of the intermediate preform. In the four second holes, the closest distance between the two second holes adjacent to each other is 2 mm or more. A second glass rod is inserted into each of the four formed second holes. The intermediate preform is heated together with the inserted second glass rod, and the second glass rod and the intermediate preform are integrated (second step).

According to the present modification, when the multi-core fiber 101 includes the eight cores 2, even if the distance between the first hole and the second hole is narrow, the possibility of breakage of the cladding rod between the first hole and the second hole may be reduced.

Second Modification of First Embodiment of the Present Disclosure

Figure 4:
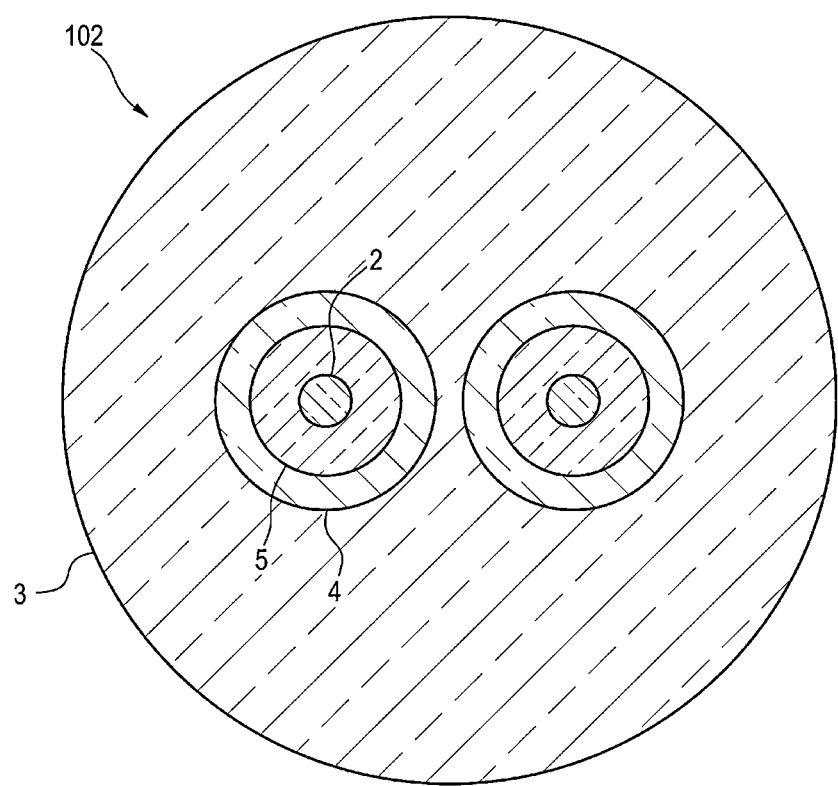
FIG. 4 is a sectional view of a multi-core fiber according to a second modification of the first embodiment.

FIG. 4 is a sectional view of a multi-core fiber 102 according to a second modification of the first embodiment of the present disclosure. As shown in FIG. 4, the multi-core fiber 102 includes two cores 2. Elements substantially the same as or corresponding to those illustrated in FIG. 1 are denoted by the same reference numerals, and a repetitive description thereof will be omitted.

Next, a manufacturing method for a preform of the multi-core fiber 102 according to the present modification will be described. The manufacturing method according to the present modification also includes the first step and the second step. First, one first hole is formed in the cladding rod. A first glass rod is inserted into the one formed first hole. The cladding rod is heated together with the inserted first glass rod, and the first glass rod and the cladding rod are integrated to form an intermediate preform (first step).

After the first step, one second hole is formed in the intermediate preform. A second glass rod is inserted into one formed second hole. The intermediate preform is heated together with the inserted second glass rod, and the second glass rod and the intermediate preform are integrated (second step).

According to the present modification, when the multi-core fiber 102 includes the two cores 2, even if the distance between the first hole and the second hole is narrow, the possibility of breakage of the cladding rod between the first hole and the second hole may be reduced.

Second Embodiment of the Present Disclosure

Figure 5:
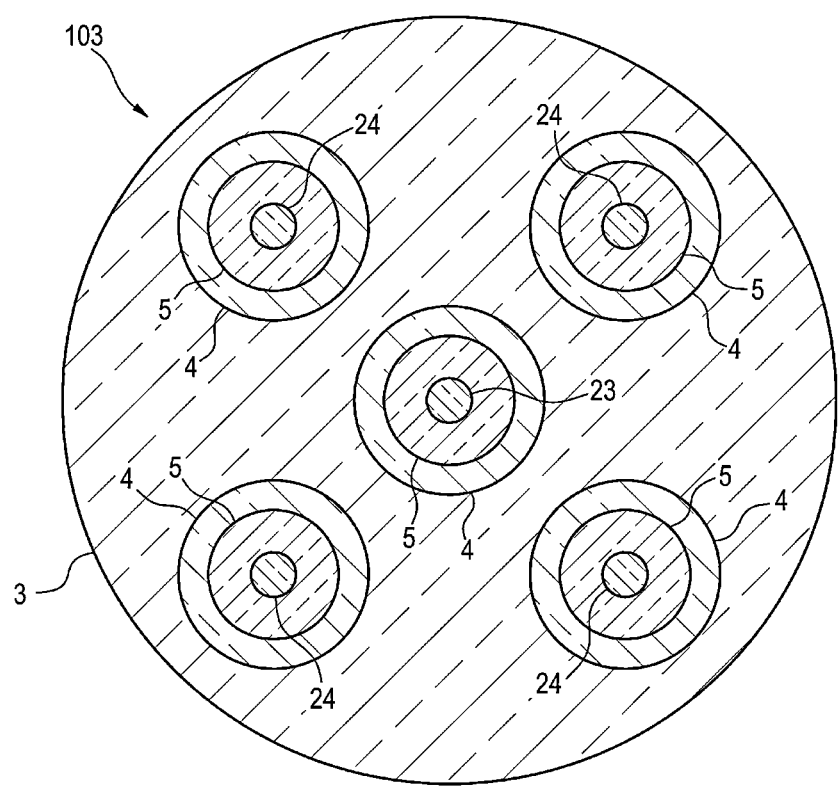
FIG. 5 is a sectional view of a multi-core fiber according to a second embodiment of the present disclosure.

FIG. 5 is a sectional view of a multi-core fiber 103 according to a second embodiment of the present disclosure. As shown in FIG. 5, the multi-core fiber 103 includes one central core 23 provided at a central axis portion of the multi-core fiber 103, and four peripheral cores 24 provided on an outer peripheral portion of the multi-core fiber 103. Elements substantially the same as or corresponding to those illustrated in FIG. 1 are denoted by the same reference numerals, and a repetitive description thereof will be omitted.

Figure 6:
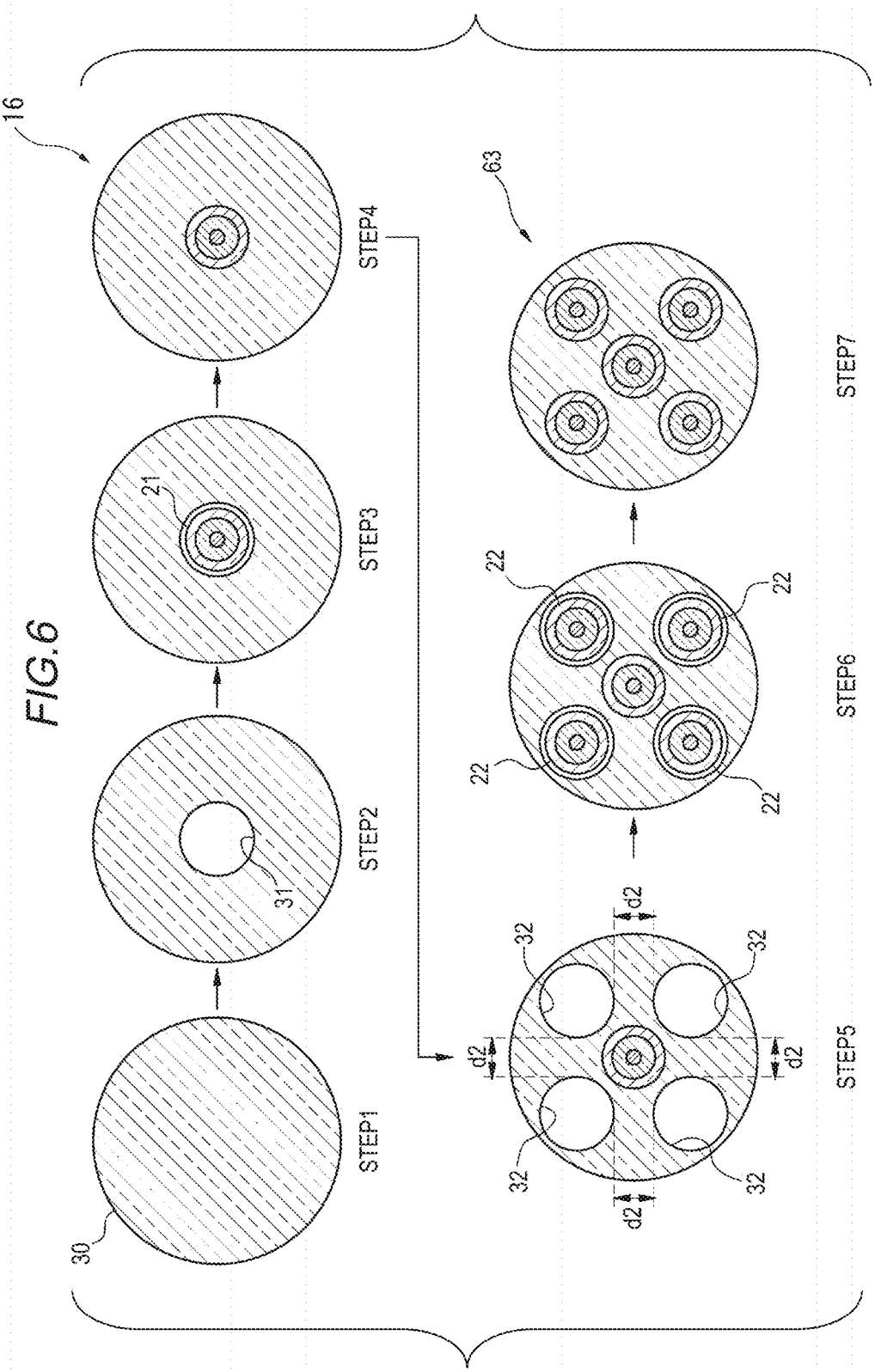
FIG. 6 is a process chart of a manufacturing method for a preform of a multi-core fiber.

Next, a manufacturing method for a preform 63 of the multi-core fiber 103 according to the present modification will be described. The manufacturing method according to the present embodiment also includes the first step and the second step. FIG. 6 is a process chart of a manufacturing method for the preform 63 of the multi-core fiber 103. As shown in FIG. 6, first, the cladding rod 30 that can be the cladding 3 of the multi-core fiber 103 is prepared (STEP 1 in FIG. 6). In the cladding rod 30, one first hole 31 is formed at a position corresponding to the central core 23 (STEP 2 in FIG. 6). The first glass rod 21 is inserted as a center glass rod into the one formed first hole 31 (STEP 3 in FIG. 6). The cladding rod 30 is heated together with the inserted first glass rod 21, and the first glass rod 21 and the cladding rod 30 are integrated to form an intermediate preform 16 (STEP 4 in FIG. 6) (first step).

After the first step, in the intermediate preform 16, four second holes 32 are formed at positions corresponding to the peripheral cores 24 (STEP 5 in FIG. 6). In the present embodiment, a position of each of the four second holes 32 is closer to the outer periphery of the intermediate preform 16 than a position of the first hole 31. In the second hole 32, the closest distance d2 between the two second holes 32 adjacent to each other is 2 mm or more. The second glass rod 22 is inserted as a peripheral glass rod into each of the four formed second holes 32 (STEP 6 in FIG. 6). The intermediate preform 16 is heated together with the inserted second glass rod 22, and the second glass rod 22 and the intermediate preform 16 are integrated (STEP 7 in FIG. 6) (second step). In this way, also in the manufacturing method according to the present embodiment, the preform 63 of the multi-core fiber 103 is manufactured through the first step and the second step.

In the general manufacturing method for the preform of the multi-core fiber, the central core and the peripheral core are integrated at the same time. During heating, the cladding rod around the center glass rod contracts to integrate with the center glass rod, and the cladding rod around the peripheral glass rod also contracts to integrate with the peripheral glass rod. At this time, since the cladding rod contracts at the same time around the center glass rod and around the peripheral glass rod, there is a matter that a position of the peripheral core tends to shift. In addition, when the cladding rod is thick, heat hardly reaches the center glass rod during the heating, and the integration between the center glass rod and the cladding rod may be incomplete.

However, the manufacturing method for the preform 63 of the multi-core fiber 103 according to the present embodiment includes the first step and the second step. The first glass rod 21 is integrated with the cladding rod 30 at a position close to the center axis of the cladding rod 30 and an intermediate preform 16 is formed in the first step, and thereafter, the second glass rod 22 is integrated with the intermediate preform 16 at a position close to the outer periphery of the intermediate preform 16 in the second step. That is, when the second glass rod 22 is integrated, the second glass rod 22 is positioned with higher accuracy without being affected by contraction of the cladding rod 30 around the first glass rod 21.

First Modification of Second Embodiment of the Present Disclosure

Figure 7:
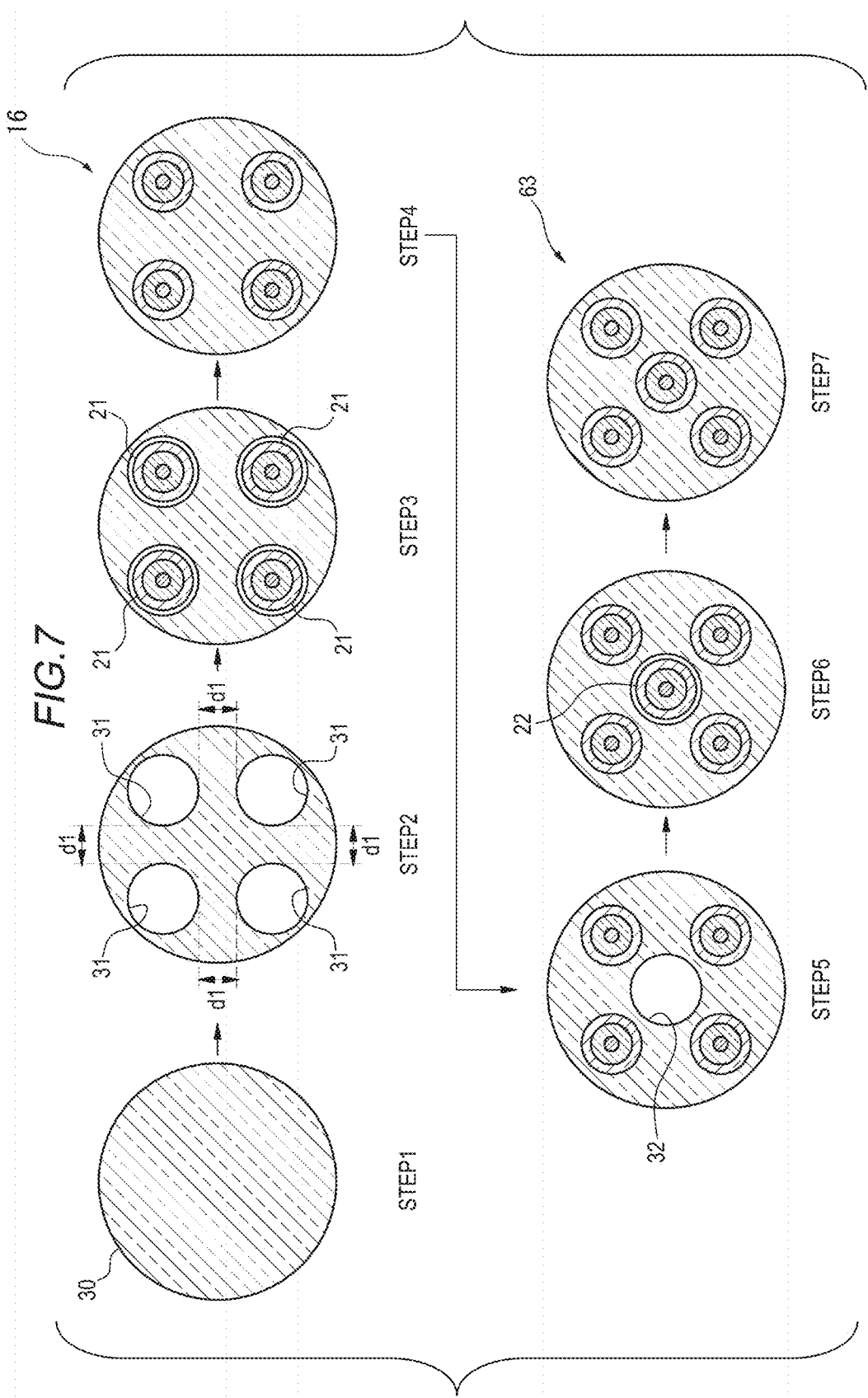
FIG. 7 is a process chart of a manufacturing method for a preform of a multi-core fiber according to a modification.

FIG. 7 is a process chart of a manufacturing method for the preform 63 of the multi-core fiber 103 according to a modification. Elements substantially the same as or corresponding to those illustrated in FIG. 6 are denoted by the same reference numerals, and a repetitive description thereof will be omitted. As shown in FIG. 7, first, the cladding rod 30 that can be the cladding 3 of the multi-core fiber 103 is prepared (STEP 1 in FIG. 7). In the cladding rod 30, four first holes 31 are formed at positions corresponding to the peripheral cores 24 (STEP 2 in FIG. 7). In the first hole 31, the closest distance d1 between the two first holes 31 adjacent to each other is 2 mm or more. The first glass rod 21 is inserted as the peripheral glass rod into each of the four formed first holes 31 (STEP 3 in FIG. 7). The cladding rod 30 is heated together with the inserted first glass rod 21, and the first glass rod 21 and the cladding rod 30 are integrated to form an intermediate preform 16 (STEP 4 in FIG. 7) (first step).

After the first step, in the intermediate preform 16, one second hole 32 is formed at a position corresponding to the central core 23 (STEP 5 in FIG. 7). In the present embodiment, the position of one second hole 32 is closer to the center axis of the intermediate preform 16 than the position of the first hole 31. The second glass rod 22 is inserted as the center glass rod into the one formed second holes 32 (STEP 6 in FIG. 7). The intermediate preform 16 is heated together with the inserted second glass rod 22, and the second glass rod 22 and the cladding rod 30 are integrated (STEP 7 in FIG. 7) (second step). In this way, also in the manufacturing method according to the present embodiment, the preform 63 of the multi-core fiber 103 is manufactured through the first step and the second step.

According to the present embodiment, the first glass rod 21 is integrated with the cladding rod 30 at a position close to the outer periphery of the cladding rod 30 to form an intermediate preform 16 in the first step, and thereafter, the second glass rod 22 is integrated with the intermediate preform 16 at a position close to the center of the intermediate preform 16 in the second step. That is, when the second glass rod 22 is integrated, the first glass rod 21 is already integrated, so that the second glass rod 22 is positioned with higher accuracy without being affected.

Figure 8:
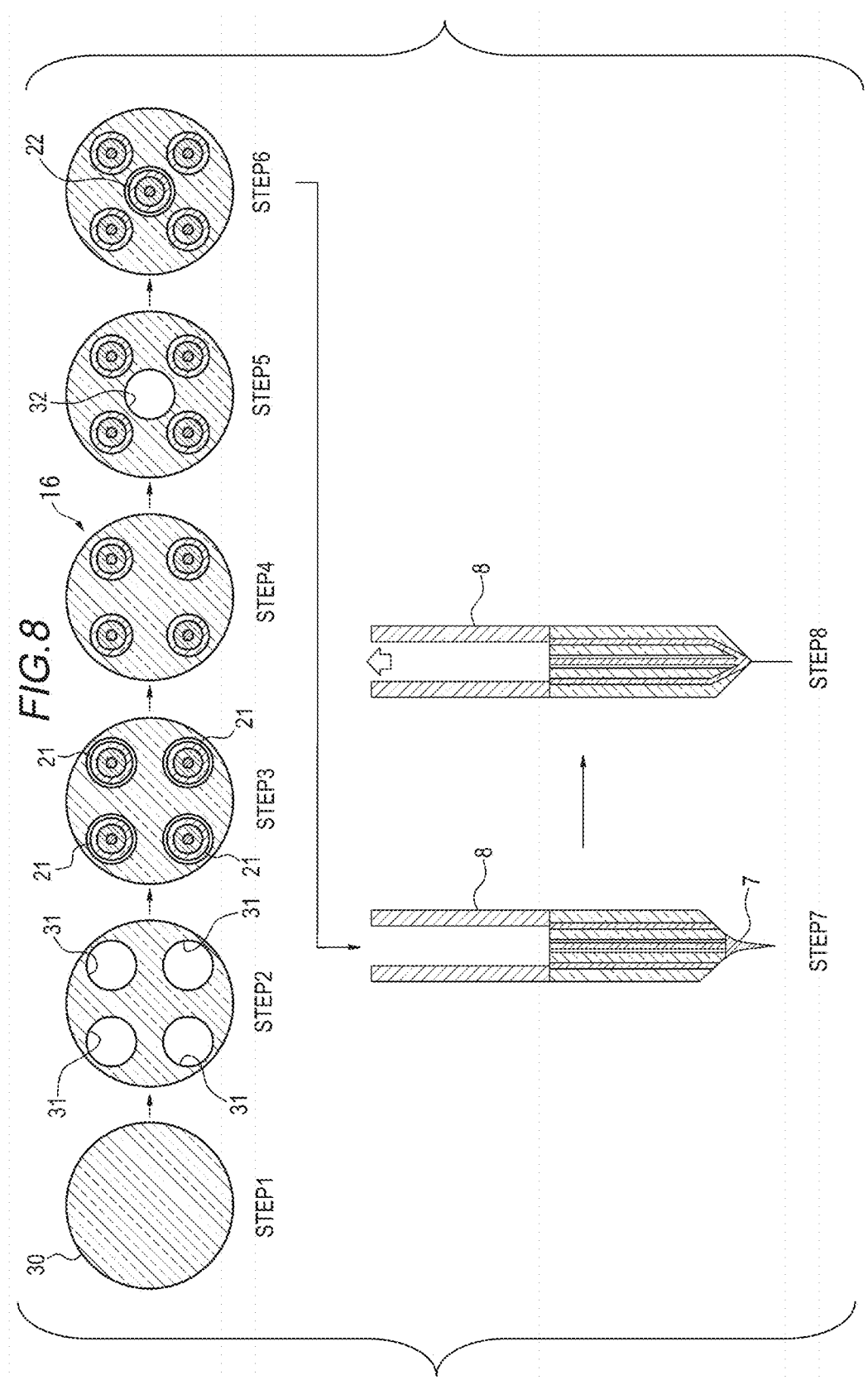
FIG. 8 is a process chart of the manufacturing method for a preform of a multi-core fiber.

FIG. 8 is a process chart of a manufacturing method for the multi-core fiber 103. In FIGS. 2, 6, and 7, the manufacturing method for the preforms 6, 63 has been described, but FIG. 8 shows the manufacturing method for the multi-core fiber 103. The manufacturing method for the multi-core fiber 103 includes a drawing step in addition to the first step and the second step. Since STEP 1 to STEP 6 in FIG. 8 are the same as STEP 1 to STEP 6 in FIG. 7, descriptions thereof will be omitted.

In the second step according to the present embodiment, the second glass rod is inserted into the second hole 32 (STEP 6 in FIG. 8), and the process ends. That is, the second glass rod 22 and the intermediate preform 16 are not heated and integrated.

After the second step, the cladding rod 30 into which the second glass rod 22 is inserted is connected to a glass block 7 and a dummy pipe 8 (STEP 7 in FIG. 8). Specifically, the glass block 7 is connected to one end of the intermediate preform 16, and the dummy pipe 8 is connected to the other end of the intermediate preform 16. At this time, the dummy pipe 8 is installed so as not to overlap with one second glass rod 22 at a position corresponding to the central core 23. The dummy pipe 8 may overlap with the four first glass rods 21 at positions corresponding to the peripheral cores 24.

The inside of the dummy pipe 8 is depressurized in a state in which the one end of the intermediate preform 16 is sealed by the glass block 7. The one end of the intermediate preform 16 and the glass block 7 are heated by a heater (not shown). At this time, the heated glass block 7 drops as a glass drop. Following the dropped glass drop, the second glass rod 22 and the intermediate preform 16 are integrated, and the multi-core fiber 103 is pulled out (STEP 8 in FIG. 8). In the present disclosure, a step of depressurizing and heating (STEP 8 in FIG. 8) is a drawing step.

According to the present disclosure, since the second glass rod 22 and the intermediate preform 16 are heated and integrated in the process of the drawing step, it is not necessary to heat and integrate the second glass rod 22 and the intermediate preform 16 in the second step. Since the number of steps in the second step is reduced, manufacturing time can be shortened and cost may be reduced.

Third Modification of First Embodiment of the Present Disclosure

Figure 9:
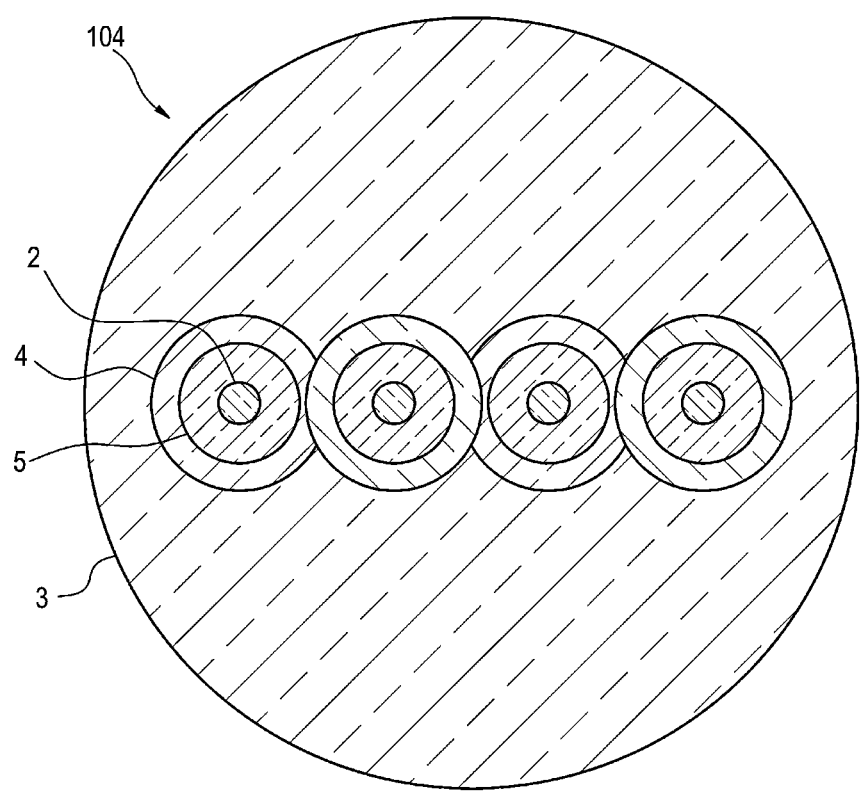
FIG. 9 is a sectional view of a multi-core fiber according to a third modification of the first embodiment.

FIG. 9 is a sectional view of a multi-core fiber 104 according to a third modification of the first embodiment of the present disclosure. As shown in FIG. 9, the multi-core fiber 104 includes four cores 2. In FIG. 1, the plurality of trenches 4 are arranged at positions separated from each other, but in FIG. 9, at least a part of one trench 4 is formed so as to overlap with other trenches 4. Elements substantially the same as or corresponding to those illustrated in FIG. 1 are denoted by the same reference numerals, and a repetitive description thereof will be omitted.

Next, a manufacturing method for a preform of the multi-core fiber 104 according to the present modification will be described. The manufacturing method according to the present modification also includes the first step and the second step. First, two first holes are formed in the cladding rod. In the two first holes, the closest distance between the two first holes adjacent to each other is 2 mm or more. A first glass rod is inserted into each of the two formed first holes. The cladding rod is heated together with the inserted first glass rod, and the first glass rod and the cladding rod are integrated to form an intermediate preform (first step).

After the first step, two second holes are formed in the intermediate preform. At this time, each of the second holes is formed by removing at least a part of the first glass rod integrated in the first step. Specifically, the second hole is formed by removing a part of a member that can be the trench 4 in the first glass rod. The second hole may be formed by removing a part of a member that can be the core peripheral portion 5 in the first glass rod. The second hole may be formed as long as a member that can be a core in the first glass rod is not removed. In the two second holes, the closest distance between the two second holes adjacent to each other is 2 mm or more. A second glass rod is inserted into each of the two formed second holes. The intermediate preform is heated together with the inserted second glass rod, and the second glass rod and the intermediate preform are integrated (second step).

As described above, according to the present modification, since the second hole is formed by removing a part of the intermediate preform that can be the trench 4 or the core peripheral portion 5 in the first glass rod integrated in the first step, many second holes are formed in the intermediate preform, and many second glass rods are arranged. Therefore, in the present modification, the intermediate preform allow the glass rod to be arranged at a high density.

FIG. 9 shows that, in the case where the multi-core fiber 104 includes four cores, each of the second holes is formed by removing at least a part of the first glass rod integrated in the first step. However, the number of cores is not limited to four. Even in a case where the number of the cores is two, five, or eight, the second hole may be formed by removing at least a part of the first glass rod integrated in the first step.

Although the present disclosure has been described in detail with reference to specific embodiments, it will be apparent to those skilled in the art that various changes and modifications may be made without departing from the spirit and scope of the present disclosure. The numbers, positions, shapes or the like of components described above are not limited to the above embodiments, and can be changed to suitable numbers, positions, shapes or the like during carrying out the present disclosure. For example, the diameter of the second hole may be different from the diameter of the first hole. In addition, a configuration, shape, and size of the second glass rod may be different from a configuration, shape, and size of the first glass rod.

What is claimed is:

1. A manufacturing method for a preform of a multi-core fiber including:
   a plurality of cores; and
   a cladding that surrounds the plurality of cores in a state where the cores are separated from each other and has a refractive index smaller than a refractive index of each core,
   the manufacturing method comprising:
   forming one or more first holes in a cladding rod;
   inserting a first glass rod into each of the one or more first holes;

heating the cladding rod together with the inserted first glass rod to integrate the first glass rod and the cladding rod and to form an intermediate preform;

forming one or more second holes in the intermediate preform;

inserting a second glass rod into each of the one or more second holes; and heating the intermediate preform together with the inserted second glass rod to integrate the second glass rod and the intermediate preform, wherein the second hole is formed by removing at least a part of the first glass rod integrated with the cladding rod.

2. The manufacturing method for a preform of a multi-core fiber according to claim 1, wherein the one or more first holes include a plurality of first holes, and a closest distance between two holes of the plurality of first holes adjacent to each other is 2 mm or more.

3. The manufacturing method for a preform of a multi-core fiber according to claim 1, wherein the one or more second holes include a plurality of second holes, and a closest distance between two holes of the plurality of second holes adjacent to each other is 2 mm or more.

4. The manufacturing method for a preform of a multi-core fiber according to claim 1, wherein a position of each of the one or more second holes is closer to an outer periphery of the cladding rod than a position of each of the one or more first holes.

5. A manufacturing method for a multi-core fiber including:

a plurality of cores; and a cladding that surrounds each of the plurality of cores in a state where the cores are separated from each other and has a refractive index smaller than a refractive index of each core, the manufacturing method comprising:

forming one or more first holes in a cladding rod;

inserting a first glass rod into each of the one or more first holes;

heating the cladding rod together with the inserted first glass rod to integrate the first glass rod and the cladding rod and to form an intermediate preform;

forming one or more second holes in the intermediate preform;

inserting a second glass rod into each of the one or more second holes; and drawing the intermediate preform together with the inserted second glass rod, wherein a position of each of the one or more second holes is closer to a center axis of the cladding rod than a position of each of the one or more first holes.

6. The manufacturing method for a multi-core fiber according to claim 5, wherein the one or more first holes include a plurality of first holes, and a closest distance between two holes of the plurality of the first holes adjacent to each other is 2 mm or more.

7. The manufacturing method for a multi-core fiber according to claim 5, wherein the one or more second holes include a plurality of second holes, and a closest distance between two holes of the plurality of second holes adjacent to each other is 2 mm or more.

8. The manufacturing method for a multi-core fiber according to claim 5, wherein the second hole is formed by removing at least a part of the first glass rod integrated with the cladding rod.

9. A manufacturing method for a preform of a multi-core fiber including:

a plurality of cores; and a cladding that surrounds the plurality of cores in a state where the cores are separated from each other and has a refractive index smaller than a refractive index of each core, the manufacturing method comprising:

forming one or more first holes in a cladding rod;

inserting a first glass rod into each of the one or more first holes;

heating the cladding rod together with the inserted first glass rod to integrate the first glass rod and the cladding rod and to form an intermediate preform;

forming one or more second holes in the intermediate preform;

inserting a second glass rod into each of the one or more second holes; and heating the intermediate preform together with the inserted second glass rod to integrate the second glass rod and the intermediate preform, wherein a position of each of the one or more second holes is closer to a center axis of the cladding rod than a position of each of the one or more first holes.

10. The manufacturing method for a preform of a multi-core fiber according to claim 9, wherein the one or more first holes include a plurality of first holes, and a closest distance between two holes of the plurality of first holes adjacent to each other is 2 mm or more.

11. The manufacturing method for a preform of a multi-core fiber according to claim 9, wherein the one or more second holes include a plurality of second holes, and a closest distance between two holes of the plurality of second holes adjacent to each other is 2 mm or more.

12. The manufacturing method for a preform of a multi-core fiber according to claim 9, wherein a position of each of the one or more second holes is closer to an outer periphery of the cladding rod than a position of each of the one or more first holes.

* * * * *